UNITED STATES PATENT OFFICE.

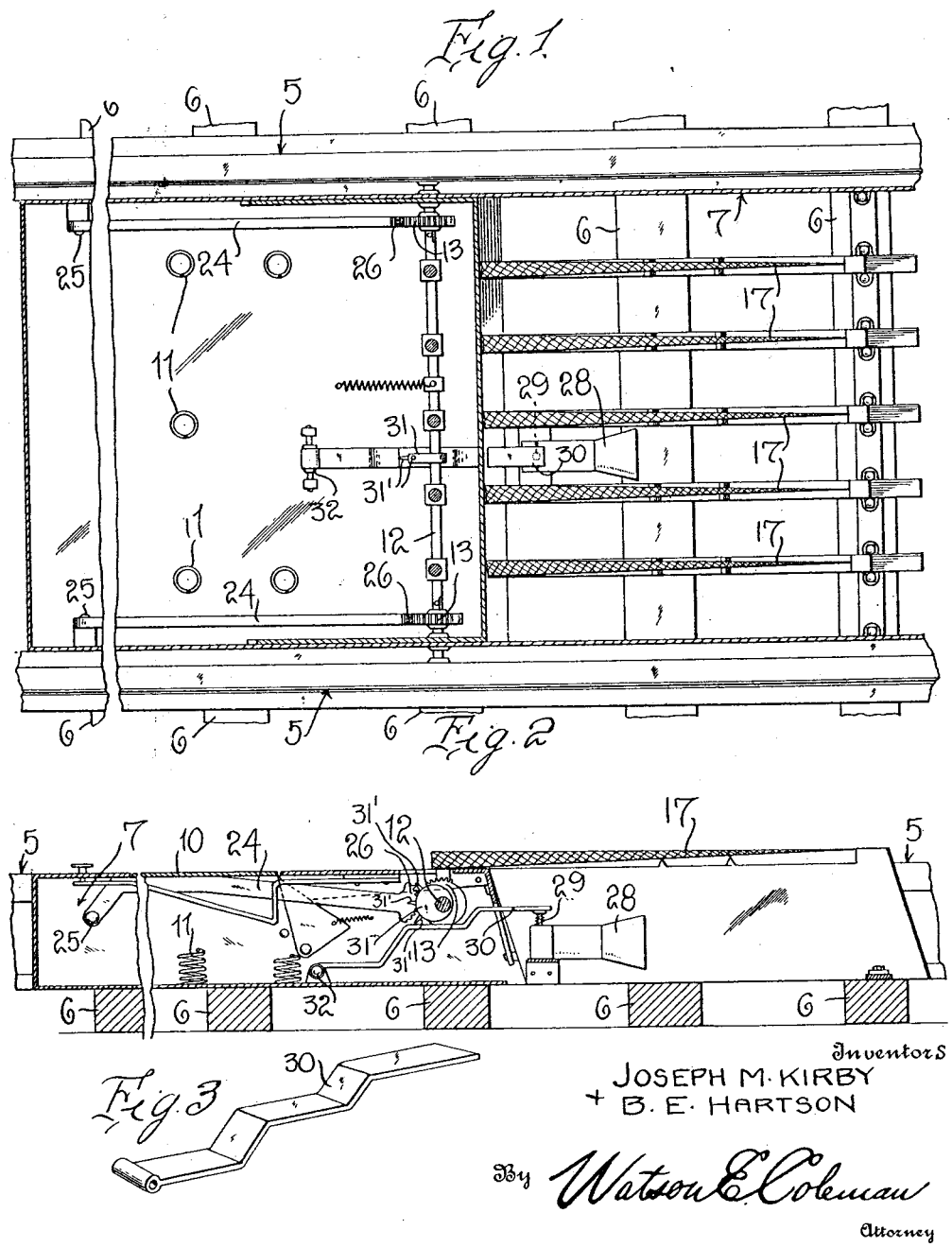

JOSEPH M. KIRBY AND BERT E. HARTSON, OF BOULDER, COLORADO.

CATTLE-GUARD.

1,193,562. Specification of Letters Patent. Patented Aug. 8, 1916.

Original application filed January 22, 1916, Serial No. 74,438. Divided and this application filed April 5, 1916. Serial No. 89,150.

*To all whom it may concern:*

Be it known that we, JOSEPH M. KIRBY and BERT E. HARTSON, citizens of the United States, residing at Boulder, in the county of Boulder and State of Colorado, have invented certain new and useful Improvements in Cattle-Guards, of which the following is a specification, reference being had to the accompanying drawings.

This invention relates to cattle guards and constitutes a division of the subject-matter disclosed in our prior application for patent, Serial Number 74,438, filed January 22, 1916.

It is the primary purpose of the present invention to provide in combination with a cattle guard including a vertically movable operating tread plate, an alarm or sound producing device automatically actuated upon the depression of the plate to scare or frighten the animals from the track.

The invention has for another and more particular object to provide a horn or other sound producing device arranged beneath the movable tread plate of the cattle guard, an operating element therefor, a rotatable actuator for engagement with said element, and means operated upon a depression of the tread plate to rotate the actuator.

It is a still further object of the invention to provide simple and efficient mechanism for the above purpose which will be very effective and reliable in practical use, and may be employed as an adjunct to our improved guard operating mechanism set forth in the prior application above referred to, at but slight additional manufacturing cost.

With the above and other objects in view, our invention consists in the novel features of construction, combination and arrangement of parts to be hereinafter more fully described, claimed and illustrated in the accompanying drawing, in which, Figure 1 is a top plan view, partly in section, of a guard such as that shown in our prior application, illustrating the present invention applied thereto; Fig. 2 is a longitudinal sectional view through the guard; and Fig. 3 is a detail perspective view of the actuating bar.

Referring in detail to the drawing, 5 designates the track rails which are spiked in the usual manner to the ties 6. Upon these ties, between the track rails, a rectangular metal frame structure indicated at 7, is secured.

The specific construction of the operating mechanism for the cattle guard being fully disclosed in our prior application, the same will not be herein set forth in detail. It will suffice to state that this mechanism includes a shaft 12 rotatably mounted at its ends in the opposite sides of the frame 7, and to this shaft a plurality of spaced guard arms 17 are fixed at one of their ends. Upon the opposite longitudinal side walls of the frame 7, levers 24 are fulcrumed at one of their ends, as at 25. Each of these levers is provided upon its other end with an arcuate rack 26 to mesh with an interrupted gear 13 on one end of the shaft 12. A tread plate or platform 10 is secured at its opposite ends upon the upper edges of the levers 24 and is yieldingly sustained against downward movement by a plurality of springs 11 which are fixed at their lower ends to the base of the frame 7. It will be understood, of course, that there is a sufficient number of teeth on the rack 26 to rotate the shaft 12 through the gear 13 for a sufficient distance to move the arms 17 to a vertical position. The springs 11 are compressed in the downward movement of the platform and act to return said platform and the bars 24, upon which the platform is secured, to their normal positions, so that the racks 26 will again engage the teeth of the gears 13 and lower the arms 17. If desired, it will be understood that a complete gear may be employed instead of the interrupted gear 13, but in any event there should be a sufficient number of teeth on this gear to insure the engagement of the rack 26 therewith in its upward movement.

Between the side walls of the frame 7, at one side of the shaft 12 and below the plane thereof, a sound producing device, indicated at 28, is suitably mounted. We have indicated this device in the form of a horn, but it will be understood that any other desired sound producing means may be substituted therefor.

29 indicates the movable operating element of this sound producing device, and with the same one end of an operating bar 30 is engaged.

Upon the shaft 12, a disk 31 is eccentrically fixed and is provided upon its periphery with a plurality of radially projecting pins or studs 31′, preferably three in number. This disk is disposed in the vertical plane of the bar 30 so that the studs will operatively engage said bar when the disk is rotated. As before stated, the operating bar 30 is offset and is pivotally mounted at its other end, as shown at 32, upon the base wall of the frame 7.

From the foregoing description, the construction and manner of operation of the device will be clearly and fully understood. When an animal enters upon the right of way and treads upon the plate 10, said plate will be forced downwardly against the action of the springs 11, and the levers 24 will thereby, in turn, be forced downwardly at their free ends. The racks 26 meshing with the gears 13 rotate the shaft 12 and raise the guard arms 17 to a vertical position, as will be readily understood. At the same time, the studs or pins 31′ on the eccentric disk 31 successively engage the bar 30 and force the free end thereof downwardly upon the element 29 of the sound producing device 28, thereby causing the desired noise or sound so that the animal will be badly frightened or scared and caused to leave the track. This result will often occur immediately upon the animal treading on the plate 10 and before the arms 17 have been completely operated.

The device as above described, consists of very few parts which may be obtained at small cost and used in conjunction with our improved guard operating means so that the entire apparatus may be readily installed at nominal expense and provides a double safeguard against possible injury to live stock or obstructing of the track by large numbers of animals.

While we have shown and described the preferred construction and arrangement of the several elements employed, it is to be understood that the device is susceptible of considerable modification therein and we, therefore, reserve the privilege of adopting all such legitimate changes as may be fairly embodied within the spirit and scope of the invention as claimed.

Having thus fully described our invention, what we desire to claim and secure by Letters Patent is:—

1. In a cattle guard for railroads, a vertically movable tread plate, a sound producing device, a pivoted operating bar for said device, a shaft provided with spaced pins to intermittently engage said bar and actuate said device, and operating connections between said shaft and the tread plate.

2. In a cattle guard for railroads, the combination of a vertically movable tread plate, a sound producing device, a pivoted operating bar for said device, a shaft provided with spaced pins to intermittently engage said bar and operate the device, and levers supporting the tread plate operatively connected to said shaft.

3. In a cattle guard for railroads, the combination of a vertically movable tread plate, a sound producing device, a pivoted operating bar for said device, a shaft provided with spaced pins to intermittently engage the bar and operate the device, pivoted levers upon which the tread plate is mounted, interrupted gears on the ends of the shaft, and racks on the ends of said levers meshing with said interrupted gears to rotate the shaft.

In testimony whereof we hereunto affix our signatures in the presence of two witnesses.

JOSEPH M. KIRBY.
BERT E. HARTSON.

Witnesses:
  B. KALLGREN,
  CHAS. F. LINSLEY.

Copies of this patent may be obtained for five cents each, by addressing the "Commissioner of Patents, Washington, D. C."